US010648401B2

(12) United States Patent
Mitsuyama et al.

(10) Patent No.: US 10,648,401 B2
(45) Date of Patent: May 12, 2020

(54) ENGINE SYSTEM AND METHOD FOR CONTROLLING SAME

(71) Applicant: ISUZU MOTORS LIMITED, Shinagawa-ku, Tokyo (JP)

(72) Inventors: Motoki Mitsuyama, Hachioji (JP); Hirofumi Hashimoto, Ayase (JP); Hotaka Saitou, Fujisawa (JP); Hitoshi Takikawa, Yokohama (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 16/077,408

(22) PCT Filed: Feb. 2, 2017

(86) PCT No.: PCT/JP2017/003728
§ 371 (c)(1),
(2) Date: Aug. 10, 2018

(87) PCT Pub. No.: WO2017/138423
PCT Pub. Date: Aug. 17, 2017

(65) Prior Publication Data
US 2019/0048788 A1    Feb. 14, 2019

(30) Foreign Application Priority Data

Feb. 12, 2016    (JP) .................................. 2016-024481

(51) Int. Cl.
*F02B 37/00* (2006.01)
*F02B 37/16* (2006.01)
(Continued)

(52) U.S. Cl.
CPC .......... *F02B 37/004* (2013.01); *F02B 37/013* (2013.01); *F02B 37/16* (2013.01);
(Continued)

(58) Field of Classification Search
CPC ...... F02B 37/004; F02B 37/013; F02B 37/16; F02B 37/162; F02B 37/18;
(Continued)

(56) References Cited

U.S. PATENT DOCUMENTS 5,063,744 A * 11/1991 Ishiyama .............. F02B 37/013
                                                           60/600
5,142,866 A *  9/1992 Yanagihara ........... F02B 37/013
                                                           60/605.2
(Continued)

FOREIGN PATENT DOCUMENTS

CN      102482992 A    5/2012
DE  102004051486 A1    1/2006
(Continued)

OTHER PUBLICATIONS

International Search Report and Written Opinion for related International Application No. PCT/JP2017/003728; dated Apr. 18, 2017; English translation of ISR provided; 11 pages.
(Continued)

*Primary Examiner* — Jesse S Bogue
(74) *Attorney, Agent, or Firm* — Procopio, Cory, Hargreaves & Savitch LLP

(57) ABSTRACT

In an engine system 10 having a high-pressure stage turbocharger 11 and a low-pressure stage turbocharger 12 provided in series, a control device 40 is configured to perform control such that when switching from multi-stage supercharging Cm to single-stage supercharging Cs, after only the exhaust bypass valve 23 is opened, and thereafter, an intake bypass valve 21 is opened later than at a timing at which the exhaust bypass valve 23 is opened.

6 Claims, 8 Drawing Sheets

(51) Int. Cl.
*F02B 37/013* (2006.01)
*F02B 37/18* (2006.01)
*F02D 41/00* (2006.01)
*F02D 23/00* (2006.01)
*F02D 23/02* (2006.01)

(52) U.S. Cl.
CPC ............ *F02B 37/162* (2019.05); *F02B 37/18* (2013.01); *F02D 41/0007* (2013.01); *F02D 23/00* (2013.01); *F02D 23/02* (2013.01); *F02D 2200/0406* (2013.01); *F02D 2250/34* (2013.01); *Y02T 10/144* (2013.01)

(58) Field of Classification Search
CPC ......... F02D 2200/0406; F02D 2250/34; F02D 23/00; F02D 23/02; F02D 41/0007; Y02T 10/144
See application file for complete search history.

(56) References Cited

U.S. PATENT DOCUMENTS

| | | | |
|---|---|---|---|
| 9,038,384 B2* | 5/2015 | Tomita | F02B 37/007 60/612 |
| 9,127,602 B2* | 9/2015 | Ibuki | F02B 37/004 |
| 9,574,489 B2* | 2/2017 | Schenker | F02B 37/004 |
| 2011/0154892 A1 | 6/2011 | Ibuki et al. | |
| 2017/0159554 A1* | 6/2017 | Wang | F02B 37/18 |
| 2017/0227013 A1* | 8/2017 | Kumar | F04D 27/0246 |
| 2017/0328268 A1* | 11/2017 | Kubo | F02B 37/12 |

FOREIGN PATENT DOCUMENTS

| | | |
|---|---|---|
| JP | H03-199626 A | 8/1991 |
| JP | H03-275937 A | 12/1991 |
| JP | 2008-280861 A | 11/2008 |
| JP | 2009-270475 A | 11/2009 |
| JP | 2010-151038 A | 7/2010 |
| JP | 2015-059490 A | 3/2015 |

OTHER PUBLICATIONS

Extended European Search Report for related EP App No. 17750147.5 dated Nov. 9, 2018, 7 pages.

First Office Action for related CN Application No. CN-OA 201780010931.1, dated Jan. 3, 2020. English translation provided, 17 pages.

* cited by examiner

ENGINE SYSTEM AND METHOD FOR CONTROLLING SAME

CROSS-REFERENCE TO RELATED APPLICATIONS

This application is a U.S. National Stage entry of PCT Application No. PCT/JP2017/003728 filed on Feb. 2, 2017, which claims priority to Japanese Patent Application No. 2016-024481, filed Feb. 12, 2016, the contents of which are incorporated herein by reference.

TECHNICAL FIELD

This disclosure relates to an engine system and a method for controlling the same, and more specifically, to an engine system and a control method for avoiding generation of abnormal noise at a time of switching a supercharging state of a turbocharger in the engine system in which a plurality of turbochargers are arranged in series.

BACKGROUND ART

There has been proposed an engine system in which a plurality of turbochargers are arranged in series and switches between multi-stage supercharging by a plurality of turbochargers and single-stage supercharging by one turbocharger (for example, see Patent Literature 1).

CITATION LIST

Patent Literature

Patent Literature 1: JP-A-2010-151038

SUMMARY

Technical Problem

In the above engine system, in the multi-stage supercharging, by closing both an exhaust bypass valve and an intake bypass valve, a high-pressure stage turbocharger arranged at a downstream side of an intake passage in the plurality of turbochargers also performs supercharging. On the other hand, in the single-stage supercharging, by opening both the exhaust bypass valve and the intake bypass valve, the high-pressure stage turbocharger stops performing supercharging and supercharging is performed by the remaining turbochargers.

However, there is a problem that abnormal noise is generated when switching from the multi-stage supercharging to the single-stage supercharging, that is, when switching from a state where the high-pressure stage turbocharger performs supercharging to a state where the supercharging thereof is reduced.

In this regard, the inventor has found that the abnormal sound is generated by opening the intake bypass valve when supercharging pressure of a compressor of the high-pressure stage turbocharger is high and a pressure difference between a front and a rear of the compressor thereof is large.

During the multi-stage supercharging, the intake bypass valve and the exhaust bypass valve are substantially closed. That is, the intake bypass passage is divided into two sections by the intake bypass valve. Therefore, a pressure difference is generated between the two sections. In this way, when the intake bypass valve is opened in a state where the pressure difference is generated, and pressure of a higher side drops to a lower side, the abnormal sound is generated.

This disclosure provides an engine system which can avoid generation of abnormal noise due to a pressure difference at a time of switching a supercharging state of a turbocharger in the engine system in which a plurality of turbochargers are arranged in series, and a control method thereof.

Solution to Problem

According to an aspect of this disclosure, a control device includes a plurality of turbochargers arranged in series; an intake bypass passage which bypasses a high-pressure stage compressor of a high-pressure stage turbocharger arranged at a downstream side of an intake passage among the plurality of turbochargers; passing through the intake air bypass passage; an exhaust bypass passage which bypasses a high-pressure stage turbine of the high-pressure stage turbocharger; an exhaust bypass valve which adjusts a flow rate of exhaust gas passing through the exhaust bypass passage; and includes a control device which controls opening-and-closing of the intake valve and the exhaust bypass valve, wherein at a time when both the intake bypass valve and the exhaust bypass valve are opened and supercharging of the high-pressure stage turbocharger is switched to a stopped state from a state where both the intake bypass valve and the exhaust bypass valve are closed and the high-pressure stage turbocharger performs supercharging, the control device performs a control such that, after only the exhaust bypass valve is opened, the intake bypass valve is opened later than a timing at which the exhaust bypass valve is opened.

Further, according to an aspect of this disclosure, a control method of an engine system in which a plurality of turbochargers are arranged in series, comprising: at a time when switching from a state where an intake bypass valve is closed to shut off an intake bypass passage which bypasses a high-pressure stage compressor of a high-pressure stage turbocharger arranged at a downstream side in the intake passage among the plurality of turbochargers and an exhaust bypass valve is closed to shut off an exhaust bypass passage which bypasses a high-pressure stage turbine of the high-pressure stage turbocharger so that the high-pressure stage turbocharger performs supercharging to a state where the intake bypass valve is opened to open the intake bypass passage and the exhaust bypass valve is opened to open the exhaust bypass passage so that the high-pressure stage turbocharger stops performing supercharging, a step of opening only the exhaust bypass valve; and a step of opening the intake bypass valve later than a timing at which the exhaust bypass valve is opened after only the exhaust valve is opened.

A more specific timing of opening the intake bypass valve may be when a pressure difference between a pressure at an upstream side and a pressure at a downstream side of the high-pressure stage compressor in the intake passage becomes equal to or less than a threshold, that is, when the pressure difference becomes zero, that is, when the pressure at the upstream side and the pressure at the downstream side become equal.

Therefore, the engine system may include a pressure difference acquisition device which directly or indirectly acquires the pressure difference between the pressure at the upstream side and the pressure at the downstream side of the high-pressure stage compressor in the intake passage. As a pressure difference acquisition device, two pressure sensors which acquire intake pressure at the upstream side and intake pressure at the downstream side of the high-pressure stage compressor in the intake passage are exemplified as an example of acquiring the pressure difference directly. As an example of indirectly acquiring the pressure difference, a valve-opening-state acquisition device which acquires a valve opening state of the exhaust bypass valve is exemplified.

The control of deciding a timing at which the intake bypass valve is opened by using the two pressure sensors is exemplified by the control of opening the intake bypass valve when the pressure difference acquired via the two pressure sensors becomes equal to or less than a preset threshold or becomes zero.

Further, the control of deciding the timing at which the intake bypass valve is opened by using the two pressure sensors is exemplified by the control of opening the intake bypass valve by acquiring the valve opening state of the exhaust bypass valve opened earlier via the valve-opening-state acquisition device and predicting the pressure difference from the valve opening state. Here, the valve opening state is a state of the exhaust bypass valve which changes according to a control signal of the control device, and indicates an opening degree of the exhaust bypass valve, an opening time thereof, or the like.

More specifically, as the valve opening state of the exhaust bypass valve, a maintenance time in which the opening degree of the exhaust bypass valve is maintained at a preset allowed opening degree or above is acquired and control is performed to open the intake bypass valve when the maintenance time reaches a preset allowed time.

Effect of the Invention

According to the engine system and the control method thereof, when switching from a state where the high-pressure stage turbocharger performs supercharging to a state where the high-pressure stage turbocharger stops performing supercharging, only the exhaust bypass valve is opened first, and the intake bypass valve is opened later than the timing at which the exhaust bypass valve is opened.

That is, by opening the exhaust bypass valve first, exhaust gas bypasses the high-pressure stage turbine and reduces rotational speed of the high-pressure stage turbocharger, so that supercharging pressure of the high-pressure stage compressor can be reduced. The generation of abnormal noise can be avoided by opening the intake bypass valve in a state where the pressure difference between a front and a rear of the high-pressure stage compressor becomes small or zero.

It is possible to reliably avoid the generation of abnormal noise by directly monitoring the pressure difference and opening the intake bypass valve when the pressure difference becomes equal to or less than the threshold or becomes zero.

On the other hand, without monitoring the pressure difference directly, by indirectly predicting the pressure difference from the opening state of the exhaust bypass valve and opening the intake bypass valve, a sensor for sensing the pressure difference is not required. As a result, cost reduction can be achieved.

BRIEF DESCRIPTION OF DRAWINGS

FIG. 4A shows a correlation in the background art, and FIG. 4B shows a correlation in a control method of the engine system according to the embodiment of this disclosure.

DESCRIPTION OF EMBODIMENTS

Figure 1:
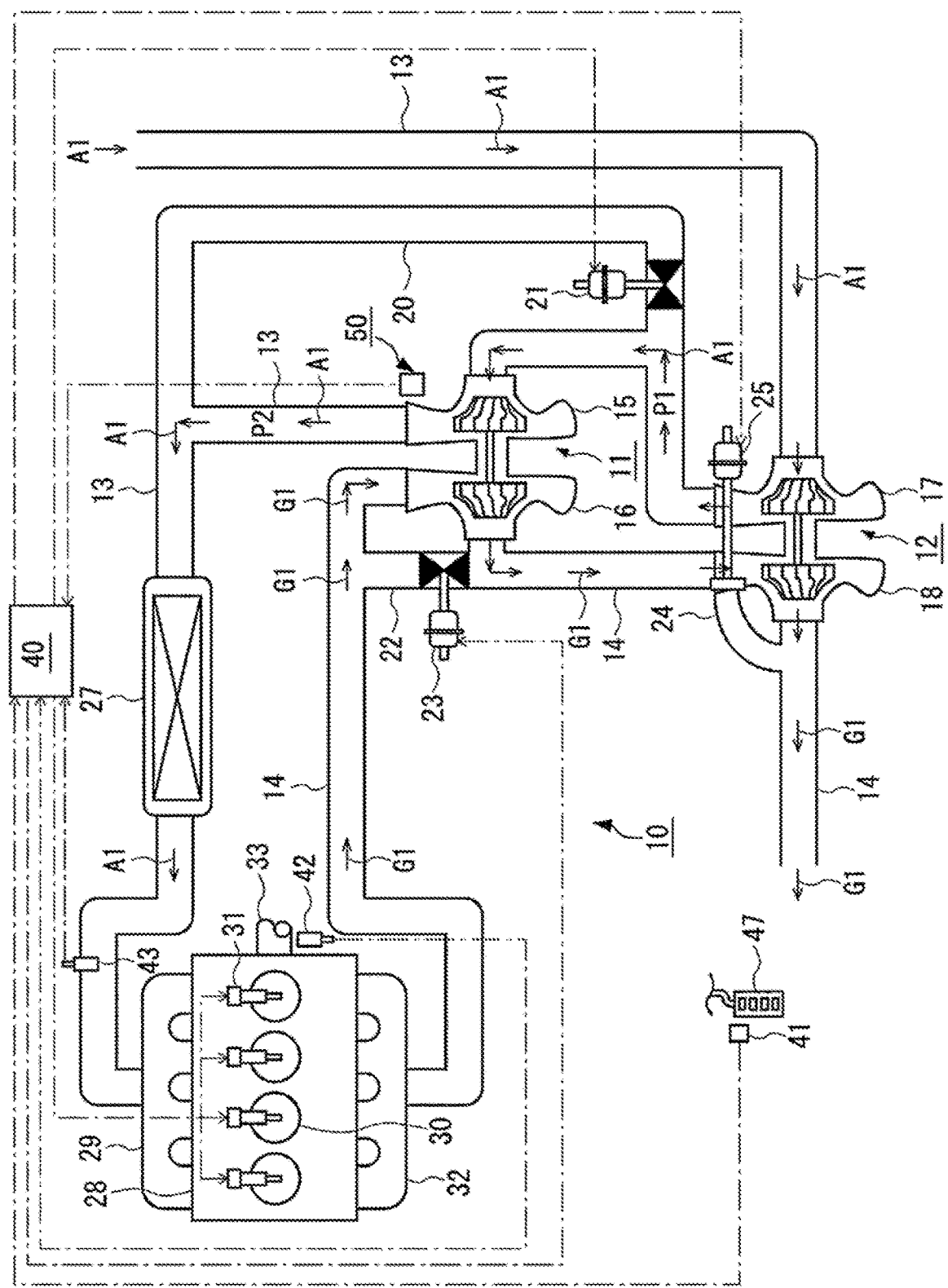
FIG. 1 is a configuration diagram illustrating a multi-stage supercharging state of an engine system according to an embodiment of this disclosure.
Figure 2:
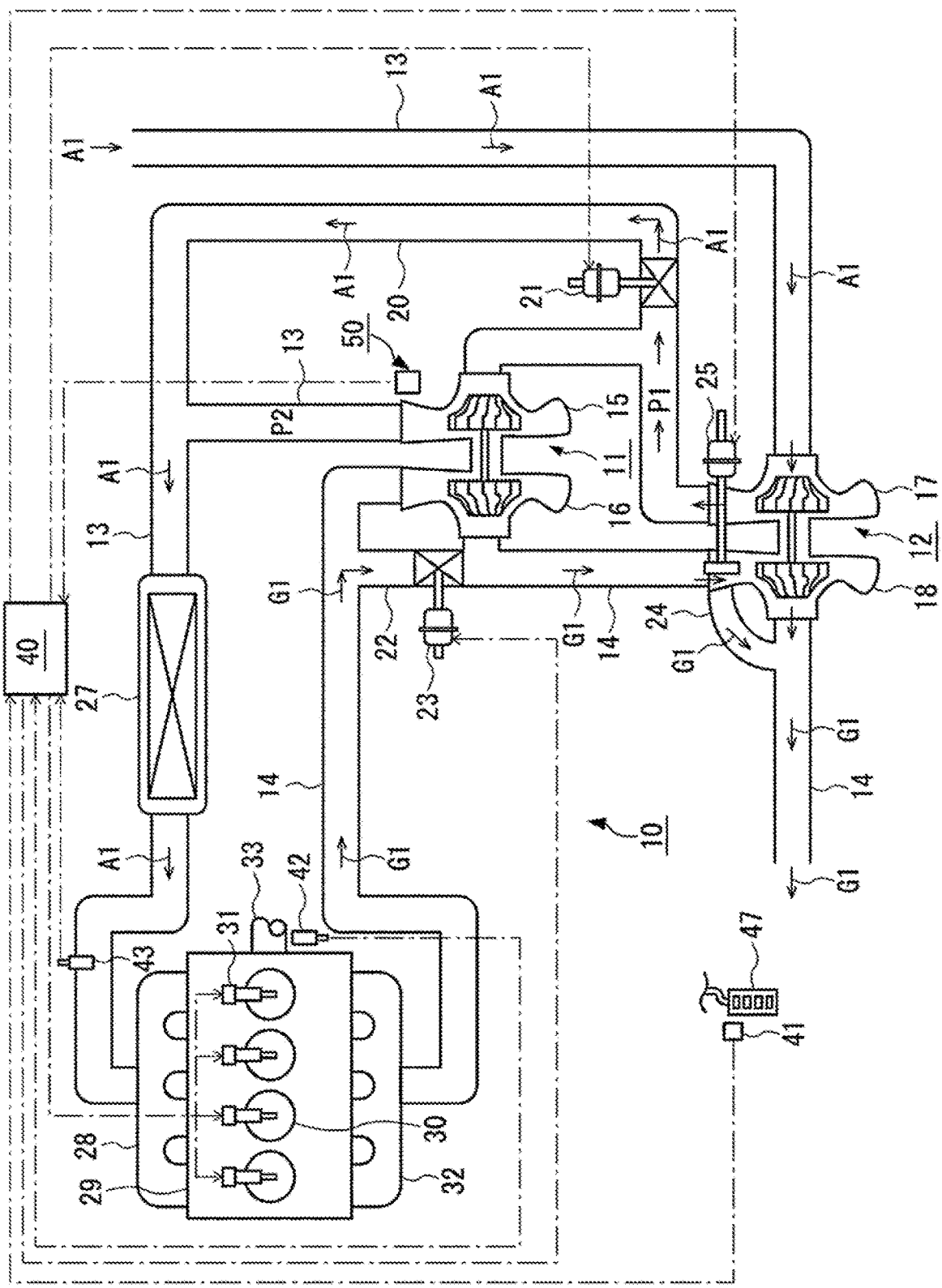
FIG. 2 is a configuration diagram illustrating a single-stage supercharging state of the engine system according to the embodiment of this disclosure.
Figure 5:
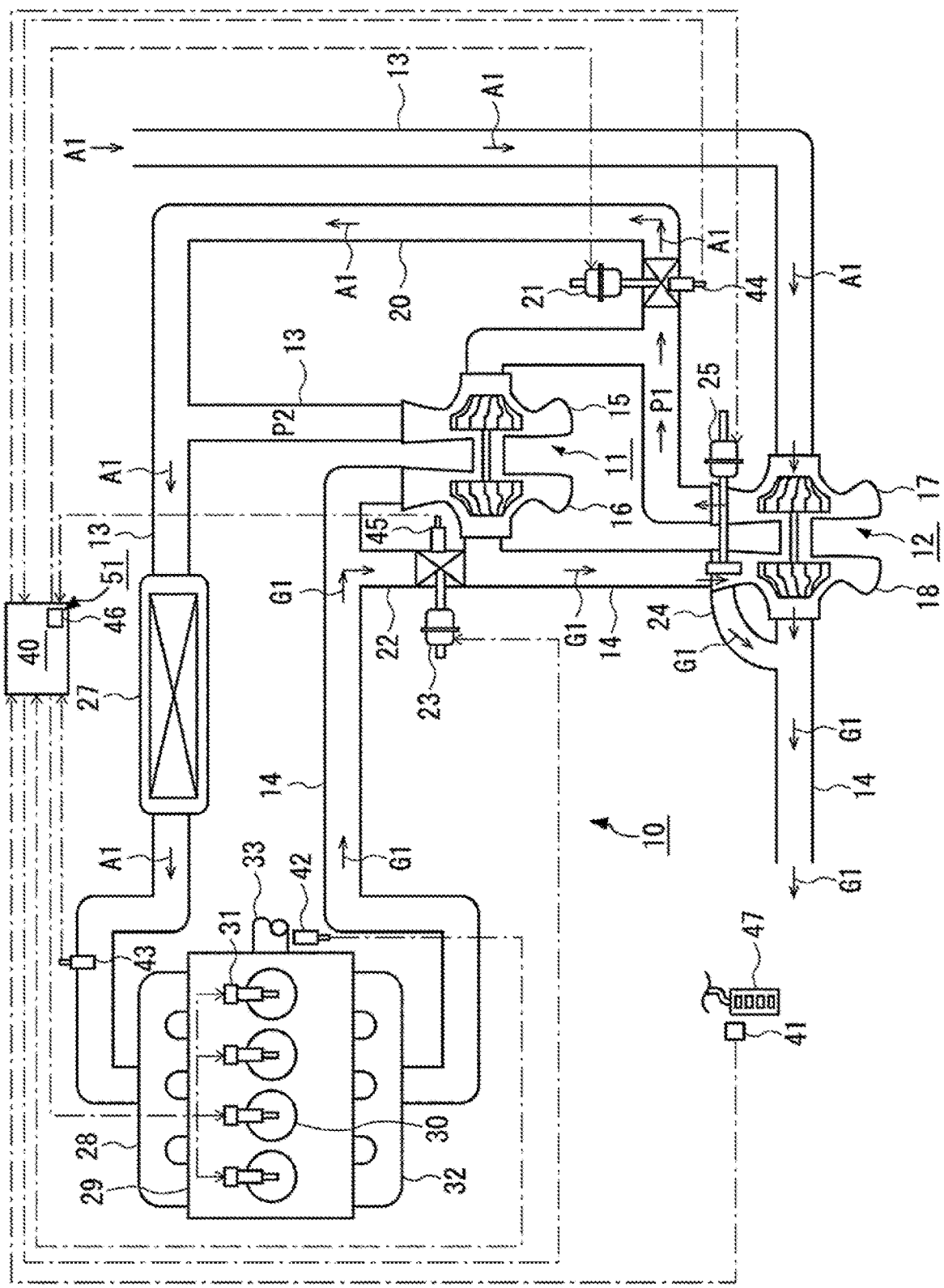
FIG. 5 is a configuration diagram illustrating an engine system according to a first embodiment of this disclosure.
Figure 7:
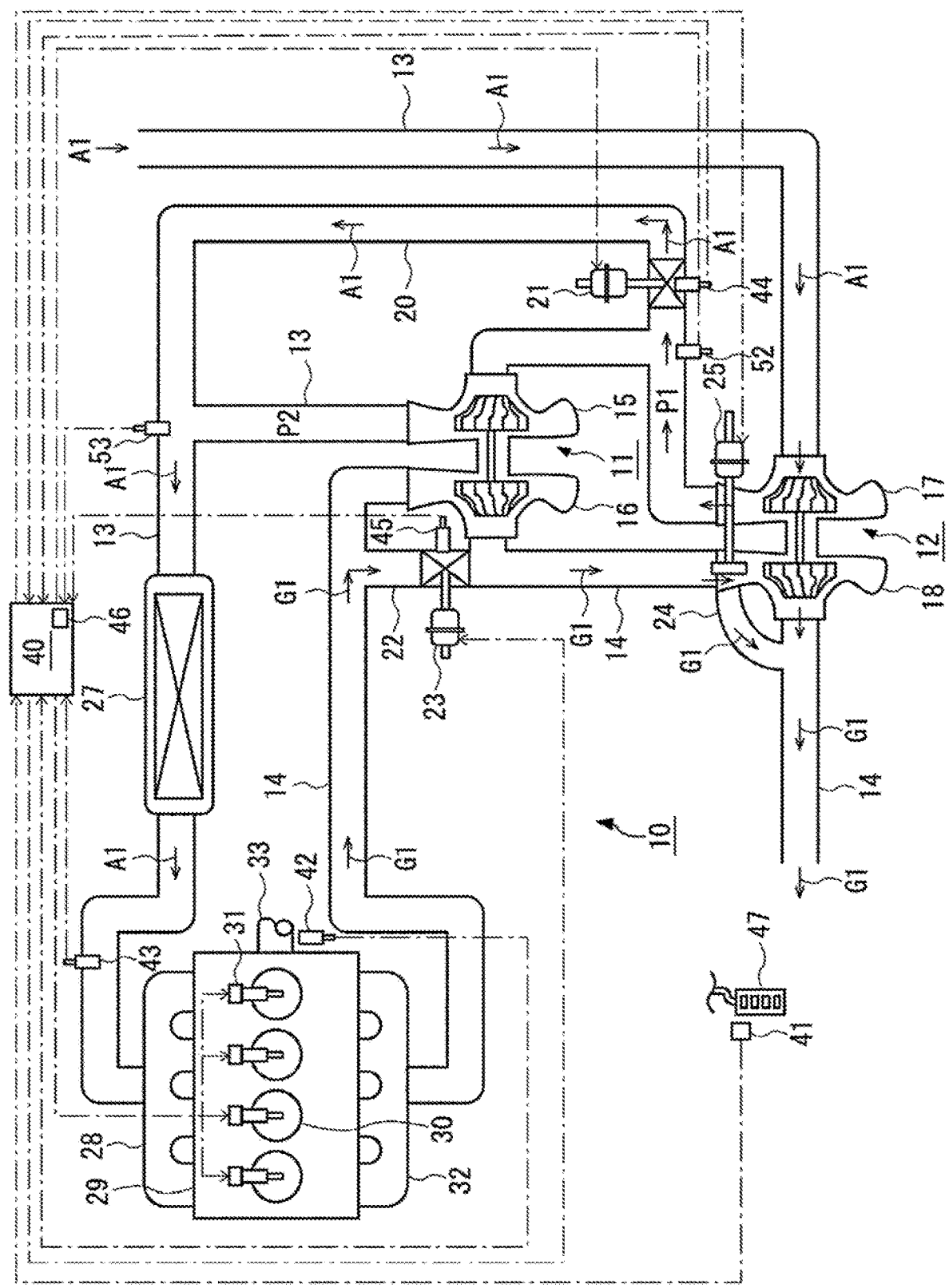
FIG. 7 is a configuration diagram illustrating an engine system according to a second embodiment of this disclosure.

Hereinafter, an embodiment of this disclosure and examples based on the embodiment will be described below with reference to the drawings. FIGS. 1 and 2 illustrate configurations of an embodiment of an engine system 10 of this disclosure. FIG. 5 illustrates a configuration of a first embodiment, and FIG. 7 illustrates a configuration of a second embodiment.

As shown in FIGS. 1 and 2, in the engine system 10 of the embodiment, a plurality of turbochargers, that is, a high-pressure stage turbocharger 11 and a low-pressure stage turbocharger 12 are arranged in series.

The high-pressure stage turbocharger 11 is arranged at a downstream side of an intake passage 13 and an upstream side of an exhaust passage 14 and is configured by connecting a high-pressure stage compressor 15 and a high-pressure stage turbine 16 via a rotation shaft. The low-pressure stage turbocharger 12 is arranged at an upstream side of the intake passage 13 and at a downstream side of the exhaust passage 14 and is configured by connecting a low-pressure stage compressor 17 and a low-pressure stage turbine 18 via a rotation shaft.

The engine system 10 includes an intake bypass passage 20 which bypasses the high-pressure stage compressor 15, an intake bypass passage 21 which adjusts a flow rate of intake air A1 passing through the intake bypass passage 20, an exhaust bypass passage 22 which bypasses the high-pressure stage turbine 16, and an exhaust bypass valve 23 which adjusts a flow rate of exhaust gas G1 passing through the exhaust bypass passage 22.

In the engine system 10, when both the intake bypass valve 21 and the exhaust bypass valve 23 are closed, both the intake bypass passage 20 and the exhaust bypass passage 22 are shut off. Accordingly, the engine system is switched to multi-stage supercharging Cm in which the plurality of turbochargers perform supercharging, that is, in addition to the low-pressure stage turbocharger 12, the high-pressure stage turbocharger 11 performs supercharging. On the other hand, when both the intake bypass valve 21 and the exhaust bypass valve 23 are opened, both the intake bypass passage 20 and the exhaust bypass passage 22 are opened. Accordingly, the engine system is switched to a single-stage supercharging Cs in which the high-pressure stage turbocharger 11 is bypassed and supercharging only performed by the low-pressure stage turbocharger 12, that is, supercharging of the high-pressure stage turbocharger 11 is stopped.

In the engine system 10, particularly when the intake air A1 is supercharged by the single-stage supercharging Cs, the flow rate of exhaust gas G1 flowing into the low-pressure stage turbine 18 is adjusted by a wastegate valve 25 arranged in a wastegate passage 24 which divides the exhaust gas G1 flowing into the low-pressure stage turbine 18.

The intake bypass valve 21, the exhaust bypass valve 23, and the wastegate valve 25 operate when an air cylinder, a hydraulic cylinder, and an electric motor are supplied with a working fluid (compressed air or oil) by a control signal, and an opening degree is adjusted by a flow rate of the working fluid. These valves may be electromagnetic valves which operate a valve element by magnetic force of an electromagnet.

More specifically, as shown in FIG. 1, during the multi-stage supercharging Cm, the exhaust gas G1 exhausted to the exhaust passage 14 passes through and drives the high-pressure stage turbine 16 and the low-pressure stage turbine 18 in this order. On the other hand, the intake air A1 is sucked into the intake passage 13 from the outside, passes through and is compressed by the low-pressure stage compressor 17 and the high-pressure stage compressor 15 in this order to become high in temperature, and is cooled by an intercooler 27.

Meanwhile, as shown in FIG. 2, in the single-stage supercharging Cs, the exhaust gas G1 exhausted to the exhaust passage 14 bypasses the high-pressure stage turbine 16 via the exhaust bypass passage 22. Accordingly, the driving of the high-pressure stage turbine 16 is stopped. A part of the exhaust gas G1 bypassing the high-pressure stage turbine 16 drives the low-pressure stage turbine 18 by the wastegate valve 25. The remaining exhaust gas bypasses the low-pressure stage turbine 18 via the wastegate passage 24. On the other hand, the intake air A1 is sucked into the intake passage 13 from the outside, compressed by the low-pressure stage compressor 17 to be high in temperature, bypasses the high-pressure stage compressor 15 by passing through the intake bypass passage 20, and is then cooled by the intercooler 27.

In the engine system 10, the intake air A1 compressed by either the multi-stage supercharging Cm or the single-stage supercharging Cs is supplied from an intake manifold 28 to a cylinder 30 of an engine body 29. The intake air A1 supplied to the cylinder 30 is mixed with fuel injected from injectors 31 and burned to generate thermal energy, and then discharged from an exhaust manifold 32 to the exhaust passage 14 as the exhaust gas G1. The heat energy generated at this time rotates a crankshaft 33, and rotary power thereof is transmitted to drive wheels by a power transmission mechanism (not shown).

The engine system 10 includes a control device 40 which controls opening-and-closing of the intake bypass valve 21 and the exhaust bypass valve 23. When switching from the multi-stage supercharging Cm to the single-stage supercharging Cs, the control device 40 performs control to open only the exhaust bypass valve 23 first and to open the intake bypass valve 21 later than the timing at which the exhaust bypass valve 23 is opened.

More specifically, the engine system 10 further includes a pressure difference acquisition device 50 which directly or indirectly acquires a pressure difference $\Delta Px$ ($P2-P1$) between a pressure P1 at an upstream side and a pressure P2 at a downstream side of the high-pressure stage compressor 15 in the intake passage 13. Then, the control device 40 is configured to perform control to open only the exhaust bypass valve 23 first and to open the intake bypass valve 21 when the acquired pressure difference $\Delta Px$ becomes zero.

The control device 40 includes a CPU which performs various kinds of processing, an internal storage device which can read and write a program, a processing result, or the like used to perform various kinds of processing, various interfaces, or the like. The control device 40 is connected to the intake bypass valve 21, the exhaust bypass valve 23, the wastegate valve 25, and the injectors 31 via signal lines, and inputs and outputs the control signal among them. Further, the control device 40 is connected to various sensors such as an accelerator opening degree sensor 41, an engine rotational speed sensor 42, and an MAP sensor 43 via signal lines, and acquires detection values of these sensors. In addition, the control device 40 is connected to the pressure difference acquisition device 50 via a signal line and acquires the pressure difference $\Delta Px$.

The pressure difference acquisition device 50 directly or indirectly acquires the pressure difference $\Delta Px$. Acquiring the pressure difference $\Delta Px$ indirectly is to predict the pressure difference $\Delta Px$ without detecting the pressure. The pressure difference acquisition device 50 is not particularly limited as long as the pressure difference $\Delta Px$ can be acquired, but a valve-opening-state acquisition device 51 consisting of an opening degree sensor 45 and a timer 46 of the first embodiment described in FIG. 5 and pressure sensors 52 and 53 of the second embodiment described in FIG. 7 are preferably exemplified.

The pressure P1 is a pressure of the intake air A1 at an upstream side of the high-pressure stage compressor 15 and a downstream side of the low-pressure stage compressor 17 in the intake passage 13 and an outlet pressure of the low-pressure stage compressor 17. The pressure P2 is a pressure at a downstream side of the high-pressure stage compressor 15 in the intake passage 13 and an outlet pressure of the high-pressure stage compressor 15. The pressure P1 may be a pressure at an upstream side of the intake bypass valve 21 in the intake bypass passage 20, and the pressure P2 may be a pressure at a downstream side of the intake bypass valve 21 in the intake bypass passage 20.

The execution program of the control device 40 is exemplified by a supercharging control program. The supercharging control program is a program for adjusting opening degrees of the intake bypass valve 21, the exhaust bypass valve 23, and the wastegate valve 25 by open loop control based on an operating state of the engine system 10 and closed loop control based on a target supercharging pressure and an actual supercharging pressure. The supercharging control program is also a program for switching between the multi-stage Cm and the single-stage supercharging Cs.

Figure 3:
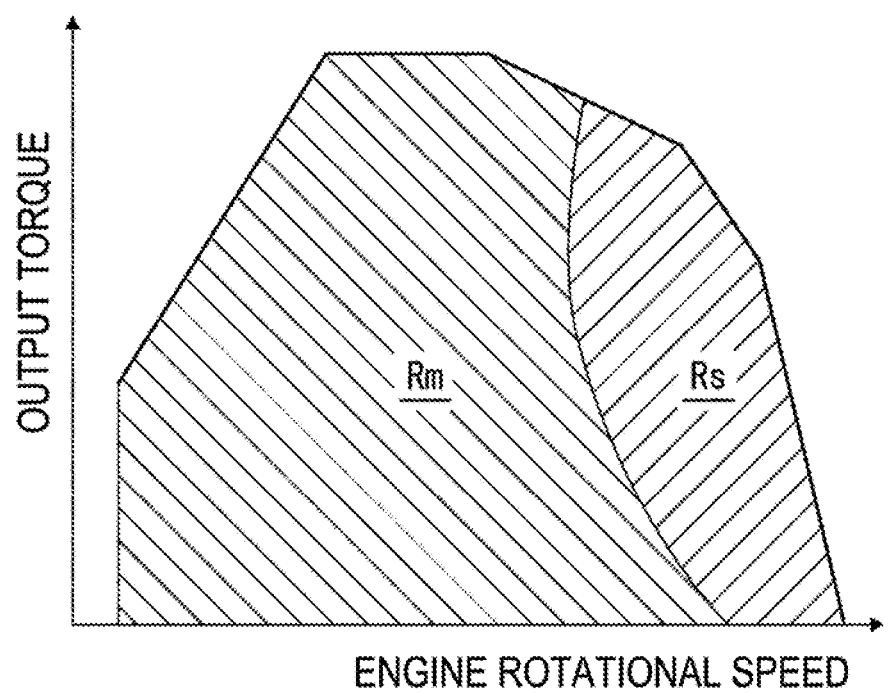
FIG. 3 is a characteristic diagram illustrating a region where multi-stage supercharging is performed and a region where single-stage supercharging is performed in an operating state of the engine system of FIG. 1.

FIG. 3 illustrates a multi-stage supercharging region Rm where supercharging is performed by the multi-stage supercharging Cm and a single-stage supercharging region Rs where supercharging is performed by the single-stage supercharging Cs in the operating state of the engine system 10.

The control device 40 adjusts the opening degree of each valve by the closed loop control based on an accelerator opening degree Ap detected by the accelerator opening degree sensor 40, that is, output torque Te corresponding to a depression amount of an accelerator pedal 47, and engine rotational speed. Ne detected by the engine rotational speed sensor 42. Specifically, map data as shown in FIG. 3 prepared in advance by an experiment or a test is stored in the internal storage device, and the opening degree of each valve is adjusted by referring to the map data to switch between the multi-stage supercharging Cm and the single-stage supercharging Cs. In the map data, instead of the output torque Te, the accelerator opening degree Ap, a fuel injection amount calculated based on the accelerator opening degree Ap, or the target supercharging pressure may be used.

The control device 40 may calculate the target boost pressure in the operating state of the engine system 10 and adjust the opening degree of each valve by the closed loop control by comparing the target supercharging pressure with an estimated supercharging pressure in the single-stage supercharging Cs. In addition, the controller 40 may adjust the opening degree of each valve by the open loop control by comparing the target supercharging pressure with the actual supercharging pressure detected by the MAP sensor 43.

Hereinafter, a control method of the engine system 10, that is, a control method of switching from the multi-stage supercharging Cm to the single-stage supercharging Cs will be described below as a function of the control device 40 with reference to FIG. 4. This control is performed when switching from the multi-stage supercharging Cm to the single-stage supercharging Cs and takes the switching as a trigger.

Figure 4A:
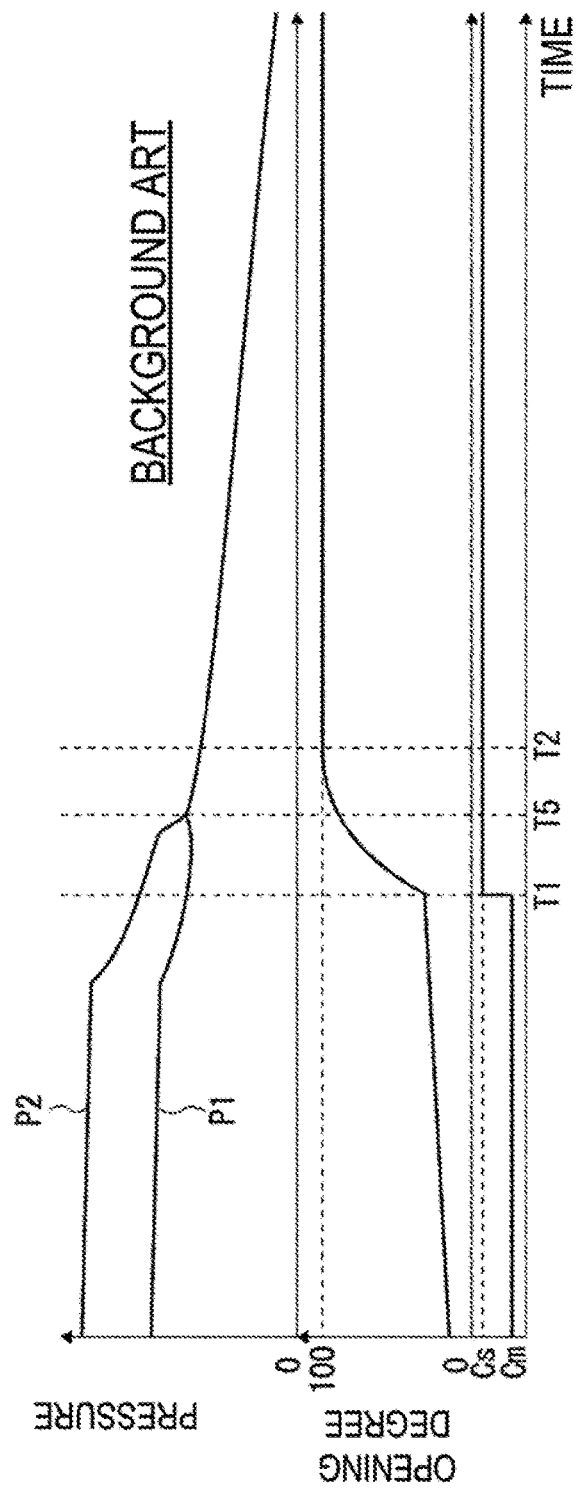
FIGS. 4A and 4B are correlation diagrams illustrating a relationship between a pressure difference over time and an opening degree of each valve.
Figure 4B:
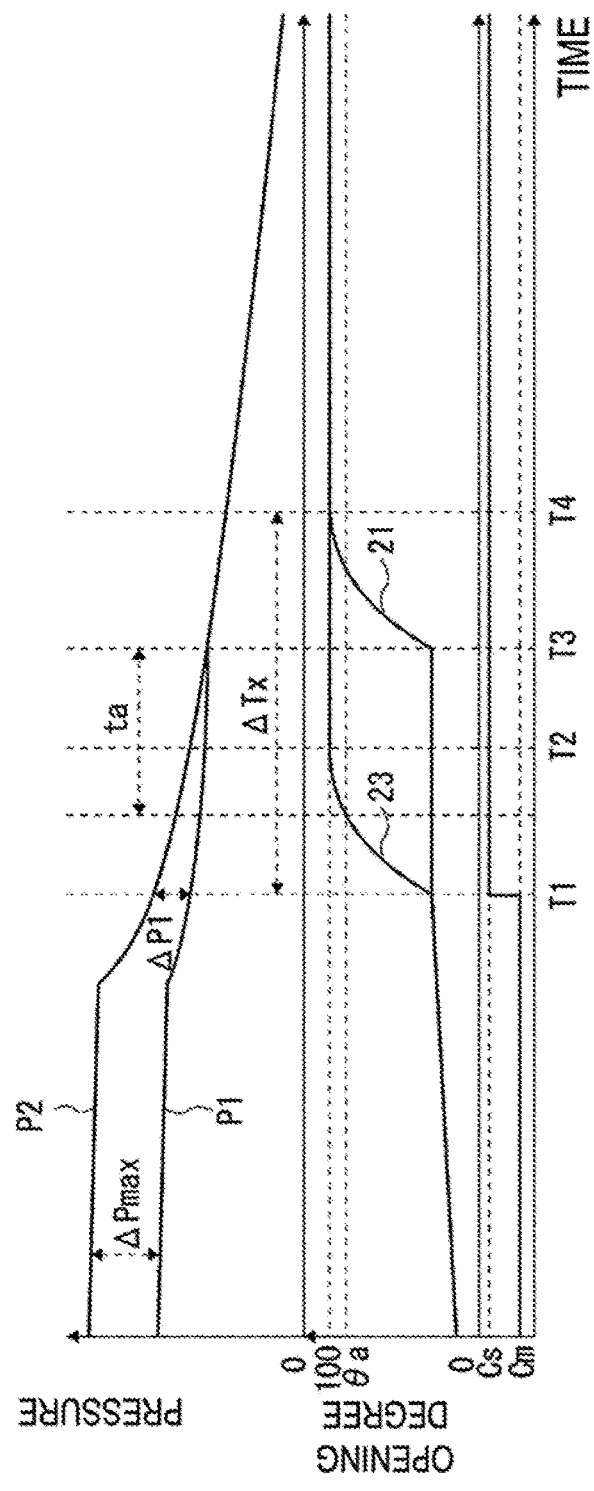

FIGS. 4A and 4B illustrate the correlation of an elapsed tune Tx in the control method, a command for switching from the multi-stage supercharging Cm to the single-stage supercharging Cs, an opening degree θy of the intake bypass valve 21, and an opening degree Ox of the exhaust bypass valve 23 in the control method. Incidentally, FIG. 4A illustrates a correlation in the prior art, and FIG. 4B illustrates a correlation in the control of this embodiment.

In the prior art of FIG. 4A, first, at a time T1, the operating region of the engine system 10 becomes the single-stage supercharging region Rs from the multi-stage supercharging region Rm, and the control device 40 starts to switch from the multi-stage supercharging Cm to the single-stage supercharging Cs. At the time T1, the control device 40 starts to open the intake bypass valve 21 and the exhaust bypass valve 23 at the same time. That is, since the intake bypass valve 21 is opened in a state where the pressure difference ΔPx is generated, the pressure P2 is released toward the low-pressure stage compressor 17 due to the pressure difference ΔPx at a time T5. This is a mechanism in which abnormal noise occurs.

On the other hand, in the above-described control method of the engine system 10, as shown in FIG. 4B, first, at the time T1, the operating region of the engine system 10 becomes the single-stage supercharging region Rs from the multi-stage supercharging region Rm, and the control device 40 starts to switch from the multi-stage supercharging Cm to the single-stage supercharging Cs. At the time T1, the control device 40 starts to open only the exhaust bypass valve 23. When the exhaust bypass valve 23 is opened, it is preferable to gradually open the exhaust bypass valve 23 to a fully open side in accordance with the elapsed time in order to avoid a sudden change in rotational speed of the high-pressure stage turbocharger 11. At a time T2, the control device 40 finally sets the exhaust bypass valve 23 to a full opening degree (100%).

When the exhaust bypass valve 23 is opened, the exhaust gas G1 bypasses the high-pressure stage turbine 16 of the high-pressure stage turbocharger 11, so that the rotational speed of the high-pressure stage turbocharger 11 is reduced. By reducing the rotational speed of the high-pressure stage turbocharger 11, the supercharging pressure of the high-pressure stage compressor 15, that is, the pressure P2 decreases. As a result, the pressure P2 approaches the pressure P1.

Next, at a time T3, when the pressure P1 becomes equal to the pressure P2, and the pressure difference ΔPx acquired via the pressure difference acquisition device 50 becomes zero, the control device 40 opens the intake bypass valve 21. At a time T4, the control device 40 finally sets the intake bypass valve 21 to a full opening degree. Therefore, the control method is completed.

The opening degree Ox of the exhaust bypass valve 23 preferably becomes the full opening degree before the pressure difference ΔPx becomes zero, but may not necessarily become the full opening degree. The opening degree Ox until the pressure difference ΔPx becomes zero may be equal to or larger than an allowed opening degree θa set before the full opening degree at which rotational speed of the high-pressure stage turbine 16 can be sufficiently reduced.

The intake bypass valve 21 is preferably opened when the pressure difference ΔPx becomes zero, but is not necessarily limited to a time when the pressure difference ΔPx becomes zero. For example, the intake bypass valve 21 may be opened when the pressure difference ΔPx becomes equal to or smaller than a preset threshold ΔPa. The threshold ΔPa is set to a value capable of determining that a pressure difference has occurred such that no abnormal noise is generated when the intake bypass valve 21 is opened. The threshold ΔPa is set to be smaller than a pressure difference ΔP1 before the exhaust bypass valve 23 is opened.

Further, a period ΔTx from the start of opening the exhaust bypass valve 23 to the end of opening the exhaust bypass valve 21 upon issuance of the command to switch from the multi-stage supercharging Cm to the single-stage supercharging Cs is a period including an allowed time to required for that the pressure P2 approaches the pressure P1 after the exhaust bypass valve 23 is opened.

As the period ΔTx, a time shorter than a shortest time in the time from switching to the single-stage supercharging Cs to switching to the multi-stage supercharging Cm in the engine system 10 is exemplified. The shortest time may be obtained in advance by an experiment or a test. In this way, when the period ΔTx becomes shorter than the shortest time, response delay of the intake bypass valve 21 can be avoided in a state where the operation state of the engine system 10 frequently switches between the multi-stage supercharging Cm and the single-stage supercharging Cs in a short time. That is, when the switching occurs in the order of the multi-stage supercharging Cm, the single-stage supercharging Cs, and the multi-stage supercharging Cm, switching to the multi-stage supercharging Cm is avoided when the intake bypass valve 21 is not opened by the single-stage supercharging Cs.

The period ΔTx is preferably set in accordance with the pressure difference ΔP1 before the exhaust bypass valve 23 is opened and the opening degree Ox of the exhaust bypass valve 23. The pressure difference ΔP1 changes based on rotation states of the high-pressure stage turbine 16 and the low-pressure stage turbine 18, that is, a flow rate of the exhaust gas G1 discharged from the engine system 10.

The period ΔTx has a positive correlation with the pressure difference ΔP1, the period ΔTx is enlarged if the pressure difference ΔP1 is large, while the period ΔTx is shortened if the pressure difference ΔP1 is small. Further, the period ΔTx has a negative correlation with the opening degree Ox of the exhaust bypass valve 23, the period ΔTx is shortened if the opening degree θx is large, while the period ΔTx is enlarged if the opening degree θx is small.

That is, a maximum value of the period ΔTx is a value when the opening degree θx of the exhaust bypass valve 23 is maintained at the allowed opening degree θa in a case where the switching is performed when the pressure difference ΔPx between the pressure P1 and the pressure P2 is a maximum value ΔPmax.

As described above, in the engine system 10 of the embodiment, control is performed such that only the exhaust bypass valve 23 starts to open earlier than the intake bypass valve 21 at the time T1 and the intake bypass valve 21 starts to open when the pressure P1 and the pressure P2 become equal at T3.

Thus, by opening the intake bypass valve 21 in a state where only the exhaust bypass valve 23 is opened earlier than the intake bypass valve 21 and the pressure difference ΔPx between the pressure P1 and the pressure P2 decreases, it is possible to avoid generation of abnormal noise due to the pressure difference ΔPx at the time of switching from the multi-stage supercharging Cm to the single-stage supercharging Cs.

Figure 6:
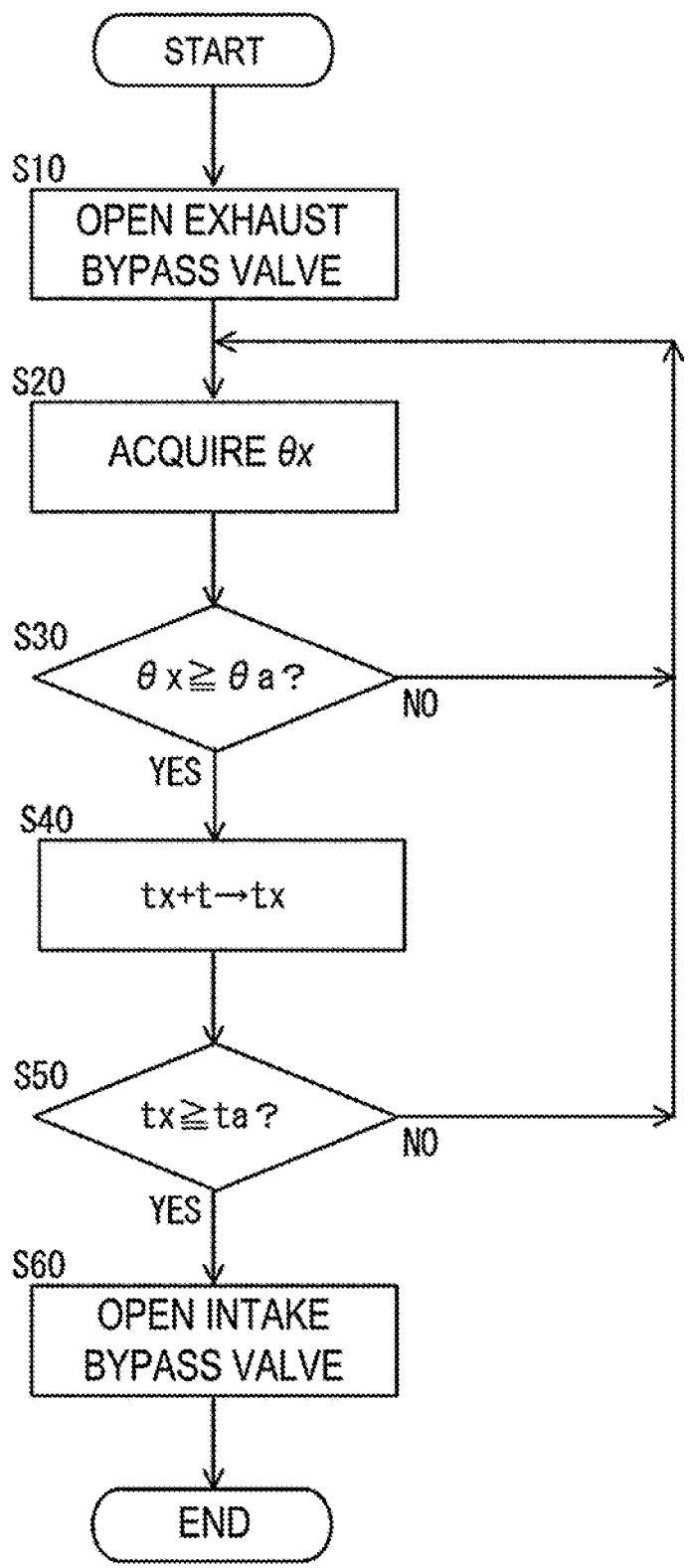
FIG. 6 is a flowchart illustrating a control method of the engine system according to the first embodiment of this disclosure.
Figure 8:
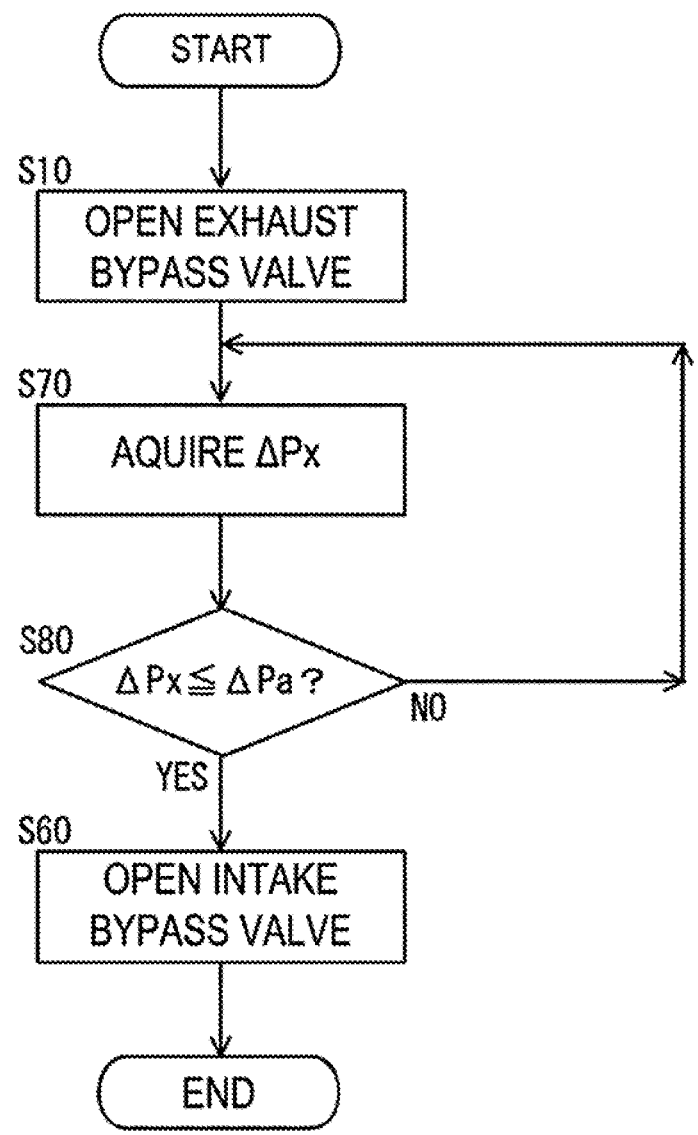
FIG. 8 is a flowchart illustrating a control method of the engine system according to the second embodiment of this disclosure.

Next, the above embodiment will be described in detail with reference to the first embodiment shown in FIGS. 5 and 6 and the second embodiment shown in FIGS. 7 and 8.

As shown in FIG. 5, in the first embodiment, the pressure difference acquisition device includes the valve-opening-state acquisition device 51 consisting of the opening degree sensor 45 and the timer 46. Then, the control device 40 is configured to acquire the valve opening state of the exhaust bypass valve 23 opened earlier than the intake bypass valve 21 via the valve-opening-state acquisition device 51 and to perform control to adjust the timing at which the intake bypass valve 21 is opened based on the valve opening state.

More specifically, the control device 40 is configured to acquire a maintenance time tx in which the opening degree θx of the exhaust bypass valve 23 is maintained at the preset allowed opening degree θa or above as the valve opening state and to perform control to open the intake bypass valve 21 when the maintenance time tx reaches the preset allowed time ta.

The valve-opening-state acquisition device 51 is a device which acquires the opening degree θx and the maintenance time tx after the exhaust bypass valve is opened as the valve opening state of the exhaust bypass valve 23 opened earlier. The valve-opening-state acquisition device 51 is not particularly limited as long as the valve-opening-state acquisition device 51 can acquire the valve opening state of the exhaust bypass valve 23, but is preferably configured by the opening degree sensor 45 and the timer 46.

The opening degree sensor 45 is a sensor which acquires the opening degree θx of the exhaust bypass valve 23. The opening degree sensor 45 is a sensor necessary for opening-and-closing the intake bypass valve 21 and the exhaust bypass valve 23 similarly to an opening degree sensor 44 which acquires the opening degree θy of the intake bypass valve 21. That is, the opening degree sensor 45 is necessarily provided when controlling the opening-and-closing of the intake bypass valve 21 and the exhaust bypass valve 23. In addition to the sensor capable of directly acquiring the opening degree θx, examples of the opening degree sensor 45 also include a sensor which indirectly acquires the opening degree θx through a supply amount of working fluid to an air cylinder or a hydraulic cylinder (an opening degree of an inflow adjusting valve), an operation length of the air cylinder or the hydraulic cylinder, or an instruction current from the control device 40.

The timer 46 is included in the control device 40, and is a timer which counts the time tx when the exhaust bypass valve 23 is open. Incidentally, the timer 46 is also used for controlling the engine system 10.

Hereinafter, the control method of the engine system 10 in the first embodiment will be described below as a function of the control device 40 with reference to the flowchart of FIG. 6.

When the operating state of the engine system 10 becomes the single-stage supercharging region Rs and switches from the multi-stage supercharging Cm to the single-stage supercharging Cs, first, the control device 40 opens only the exhaust bypass valve 23 (S10).

Next, the control device 40 acquires the opening degree θx of the exhaust bypass valve 23 via the opening degree sensor 45 (S20). Next, the control device 40 determines whether or not the acquired opening degree θx is equal to or greater than the preset allowed opening degree θa (S30). If it is determined in this step that the opening degree θx is equal to or greater than the allowed opening degree θa, the process proceeds to the next step. On the other hand, if it is determined that the opening degree θx is less than the allowed opening degree θa, the opening degree θx is acquired again (S20).

Next, the control device 40 acquires the maintenance time tx after the opening degree θx becomes equal to or greater than the allowed opening degree θa by the timer 46. Specifically, when the time at which the opening degree θx is equal to or larger than the allowed opening degree θa is zero, the timer 46 adds the unit time t for each unit time t to that time and counts the maintenance time tx (S40).

Next, the control device 40 determines whether or not the maintenance time tx after the opening degree θx becomes equal to or larger than the allowed opening θa is equal to or greater than the preset allowed time ta (S50). If it is determined in this step that the maintenance time tx is equal to or greater than the allowed time ta, the process proceeds to the next step. On the other hand, if it is determined that the maintenance time tx is less than the allowed time ta, the opening degree θx is acquired again (S20).

The allowed time ta is set to a time required that the pressure P2 approaches the pressure P1 due to a decrease in the rotational speed of the high-pressure stage turbine 16 and the high-pressure stage compressor 15. More preferably, the allowed time is set to a time required for that the pressure P1 is equal to the pressure P2, that is, the pressure difference ΔPx is zero.

The time required for that the pressure difference ΔPx becomes zero has a positive correlation with the pressure difference ΔP1 before the exhaust bypass valve 23 is opened, the time increases when the pressure difference ΔP1 is large, and the time decreases when the pressure difference ΔP1 is small. Further, the time required for that the pressure difference ΔPx becomes zero has a negative correlation with the opening that degree θx of the exhaust bypass valve 23, the time decreases when the opening degree θx is large, and the time increases when the opening degree θx is small. In addition, there is no deviation between the pressure P1 and the pressure P2 in a time later than the time required for that the pressure P1 is equal to the pressure P2.

Therefore, by an experiment or a test in advance, the maximum value ΔPmax of the pressure difference ΔPx between the pressure P1 and the pressure P2 at the time of the multi-stage supercharging Cm is set as the pressure difference when the exhaust bypass valve 23 is opened, and it is advisable to measure the allowed time ta in a situation where the allowed opening degree θa is set to the opening degree θx. By setting the allowed time ta to the maximum value at the time of switching from the multi-stage supercharging Cm to the single-stage supercharging Cs, it is possible to reliably determine that the pressure difference ΔPx becomes zero.

However, if the allowed time ta is lengthened, the period ΔTx becomes longer, and there is a possibility that the response delay occurs before the intake bypass valve 21 is opened. Therefore, it is preferable that the allowed time ta is a maximum value acquired by subtracting the time from the period ΔTx until the intake bypass valve 21 and the exhaust bypass valve 23 are changed from a fully closed state to a fully open state. In this way, the response delay of the intake bypass valve 21 can be avoided even if the operating state of the engine system 10 changes within a short time by taking into account the time from the fully closed state to the fully open state of the intake bypass valve 21 and the exhaust bypass valve 23 with respect to the allowed time ta.

The map data in which the allowed time ta is set may be obtained using the pressure difference ΔP1 and the opening degree θx as parameters and stored in the internal storage device, and the allowed time ta may be calculated from the map data. In this case, it is advantageous to avoid the occurrence of the response delay before the intake bypass valve 21 is opened.

Next, the control device 40 opens the intake bypass valve 21 (S60). When this step is completed, the control method is completed.

As described above, in the first embodiment, the valve opening state of the exhaust bypass valve 23 opened earlier than the intake bypass valve 21 is acquired, the allowed time Ta is set based on the acquired valve opening state, and the intake bypass valve 21 is opened after the elapse of the allowed time Ta. Accordingly, the pressure difference ΔPx can be indirectly predicted to be zero without directly acquiring the pressure P1 and the pressure P2. As a result, it is possible to open the intake bypass valve 21 when the pressure difference is actually small, and it is possible to avoid the generation of abnormal noise at the time of switching the supercharging of the high-pressure stage turbocharger 11.

Further, since the valve-opening-state acquisition device 51 can be configured by devices which are standardly provided in the engine system 10 such as the opening sensor 45 and the timer 46, it is unnecessary to provide a special sensor, and cost reduction can be achieved.

As shown in FIG. 7, in the second embodiment, the pressure difference acquisition device includes the pressure sensors 52 and 53. The control device 40 is configured to monitor the pressure difference ΔPx via the pressure sensors 52 and 53 and to perform control to open the intake bypass valve 21 when the pressure difference ΔPx becomes equal to or less than the preset threshold ΔPa, preferably zero.

The pressure sensor 52 is arranged in the intake passage 13 between an outlet of the low-pressure stage compressor 17 and an inlet of the high-pressure stage compressor 15, and acquires the pressure P1. The pressure sensor 52 may be arranged in the intake bypass passage 20 from a branching part between the intake passage 13 and the intake bypass passage 20 to the intake bypass valve 21.

The pressure sensor 53 is arranged in the intake passage 13 between an outlet of the high-pressure stage compressor 15 and the intercooler 27, and acquires the pressure P2. The pressure sensor 53 may be arranged in the intake bypass passage 20 from the intake bypass valve 21 to a merging part of the intake passage 13 and the intake bypass passage 20. Further, instead of the pressure sensor 53, the MAP sensor 43 arranged in the intake passage 13 at a downstream side of the intercooler 27 may be configured to detect the pressure P2. However, in consideration of a change due to a temperature change or a pressure loss caused by passing through the intercooler 27, it is preferable to arrange the MAP sensor 43 at the upstream side with respect to the intercooler 27.

Hereinafter, a control method of the engine system 10 in the second embodiment will be described below as a function of the control device 40 with reference to a flowchart of FIG. 8.

When the operating state of the engine system 10 becomes the single-stage supercharging region Rs and switches from the multi-stage supercharging Cm to the single-stage supercharging Cs, first, the control device 40 opens only the exhaust bypass valve 23 (S10).

Next, the control device 40 acquires the pressure difference ΔPx via the pressure sensors 52 and 53 (S70). Next, the control device 40 determines whether or not the pressure difference ΔPx becomes zero (S80). If it is determined in this step that the pressure difference ΔPx becomes zero, the process proceeds to the next step. On the other hand, if it is determined that the pressure difference ΔPx is not zero, that is, exceeds zero, the pressure difference ΔPx is acquired again (S70).

Next, the control device 40 opens the intake bypass valve 21 (S60). When this step is completed, the control method is completed.

As described above, in the second embodiment, it is necessary to separately provide the pressure sensors 52 and 53 as the pressure difference acquisition device 50, but the pressure difference ΔPx can be directly acquired. Then, by opening the intake bypass valve 21 when the acquired pressure difference ΔPx becomes zero, since opening the intake bypass valve 21 is reliably avoided when the pressure difference ΔPx exceeds zero, it is possible to more reliably avoid the generation of abnormal noise at the time of switching the supercharging of the high-pressure stage turbocharger 11.

The present application is based on Japanese Patent Application No. 2016-024481 filed on Jan. 12, 2016, contents of which are incorporated herein as reference.

INDUSTRIAL APPLICABILITY

According to the engine system and the control method thereof of this disclosure, in the engine system where the plurality of turbochargers are arranged in series, it is possible to avoid the generation of abnormal noise due to the pressure difference at the time of switching the supercharging state of the turbocharger.

DESCRIPTION OF REFERENCE NUMERALS 10 engine system
11 high-pressure stage turbocharger
12 low-pressure stage turbocharger
20 intake bypass passage
21 intake bypass valve
22 exhaust bypass passage
23 exhaust bypass valve
40 control device
50 pressure difference acquisition device

The invention claimed is:

1. An engine system including: a plurality of turbochargers arranged in series; an intake bypass passage which bypasses a high-pressure stage compressor of a high-pressure stage turbocharger arranged at a downstream side of an intake passage among the plurality of turbochargers; an intake bypass valve which adjusts a flow rate of intake air passing through the intake air bypass passage; an exhaust bypass passage which bypasses a high-pressure stage turbine of the high-pressure stage turbocharger; and an exhaust bypass valve which adjusts a flow rate of exhaust gas passing through the exhaust bypass passage, comprising a control device which controls opening-and-closing of the intake valve and the exhaust bypass valve, a valve opening state acquiring device which acquires a valve opening state of the exhaust bypass valve, which is opened earlier than the intake bypass valve, as the pressure difference acquisition device, and a pressure difference acquisition device which directly or indirectly acquires a pressure difference between a pressure at an upstream side and a pressure at a downstream side of the high-pressure stage compressor in the intake passage, wherein at a time when both the intake bypass valve and the exhaust bypass valve are opened and supercharging of the high-pressure stage turbocharger is switched to a stopped state from a state where both the intake bypass valve and the exhaust bypass valve are closed and the high-pressure stage turbocharger performs supercharging, the control device performs control such that, after only the exhaust bypass valve is opened, the intake bypass valve is opened later than a timing at which the exhaust bypass valve is opened, wherein the control device is configured to control to open the intake bypass valve when the pressure difference acquired via the pressure difference acquisition device becomes equal to or lower than a preset threshold after only the exhaust bypass valve is opened, wherein the control device is configured to perform control to adjust a timing at which the intake bypass valve is opened based on the valve opening state acquired via the valve-opening-state acquisition device, and wherein the control device is configured to acquire a maintenance time in which an opening degree of the exhaust bypass valve is maintained at a preset allowed opening degree or above as the valve opening state via the valve-opening-state acquisition device and to perform control to open the intake bypass valve when the maintenance time reaches a preset allowed time as determined by a timer.

2. The engine system according to claim 1,
    wherein the allowed time is set to a time required for an intake pressure at a downstream side of the high-pressure stage compressor to become equal to an intake pressure at an upstream side of the high-pressure stage compressor in the intake passage.

3. The engine system according to claim 1, wherein
    the allowed time is a maximum value acquired by subtracting, a period from a start of opening the exhaust bypass valve to an end of opening the intake bypass valve, the time where the intake bypass valve and the exhaust bypass valve are changed from a fully closed state to a fully open state.

4. A control method of an engine system in which a plurality of turbochargers are arranged in series and which includes a valve opening state acquiring device which acquires a valve opening state of the exhaust bypass valve, which is opened earlier than the intake bypass valve, as the pressure difference acquisition device, comprising:

at a time when switching from a state where an intake bypass valve is closed to shut off an intake bypass passage which bypasses a high-pressure stage compressor of a high-pressure stage turbocharger arranged at a downstream side in the intake passage among the plurality of turbochargers and an exhaust bypass valve is closed to shut off an exhaust bypass passage which bypasses a high-pressure stage turbine of the high-pressure stage turbocharger so that the high-pressure stage turbocharger performs supercharging to a state where the intake bypass valve is opened to open the intake bypass passage and the exhaust bypass valve is opened to open the exhaust bypass passage so that the high-pressure stage turbocharger stops performing supercharging, opening only the exhaust bypass valve; and opening the intake bypass valve later than a timing at which the exhaust bypass valve is opened after only the exhaust valve is opened, wherein when switching from a state where the high-pressure stage turbocharger performs supercharging to a state where the high-pressure stage turbocharger stops performing supercharging, opening only the exhaust bypass valve;

acquiring directly or indirectly a pressure difference between a pressure at an upstream side and a pressure at a downstream side of the high-pressure stage compressor in the intake passage after only the exhaust bypass valve is opened;

determining whether the pressure difference becomes equal to or smaller than a preset threshold; and opening the intake bypass valve when the pressure difference becomes equal to or smaller than the preset threshold, wherein the control method further includes:

adjusting a timing at which the intake bypass valve is opened based on the valve opening state acquired via the valve-opening-state acquisition device; and acquiring a maintenance time in which an opening degree of the exhaust bypass valve is maintained at a preset allowed opening degree or above as the valve opening state via the valve-opening-state acquisition device and opening the intake bypass valve when the maintenance time reaches a preset allowed time as determined by a timer.

5. The control method of the engine system according to claim 4,
    wherein the allowed time is set to a time required for that an intake pressure at a downstream side of the high-pressure stage compressor becomes equal to an intake pressure at an upstream side of the high-pressure stage compressor in the intake passage.

6. The control method of the engine system according to claim 4, wherein
    the allowed time is a maximum value acquired by subtracting, a period from a start of opening the exhaust bypass valve to an end of opening the intake bypass valve, the time where the intake bypass valve and the exhaust bypass valve are changed from a fully closed state to a fully open state.

\* \* \* \* \*